United States Patent [19]

Ashby, Jr.

[11] 4,109,970
[45] Aug. 29, 1978

[54] ANTI-SKID BRAKE CONTROL SYSTEM

[76] Inventor: Edward P. Ashby, Jr., P.O. Box #81470, Fairbanks, Ak. 99708

[21] Appl. No.: 794,014

[22] Filed: May 5, 1977

[51] Int. Cl.² ............................................. B60T 13/70
[52] U.S. Cl. ...................................... 303/116; 303/11; 303/61; 303/119
[58] Field of Search ...................... 303/10, 11, 61, 116, 303/119, 115; 188/85, 181 C

[56] References Cited

U.S. PATENT DOCUMENTS

| 2,753,017 | 7/1956 | Curl et al. | 188/85 |
|---|---|---|---|
| 3,231,315 | 1/1966 | Turnbull | 303/61 |
| 3,466,098 | 9/1969 | Pieren et al. | 303/61 |
| 3,679,270 | 7/1972 | Jania | 303/10 |
| 3,719,401 | 3/1973 | Peruglia | 303/119 |
| 3,981,545 | 9/1976 | Eddy | 188/181 C |

FOREIGN PATENT DOCUMENTS

451,106  5/1968  Switzerland ............................... 303/61

*Primary Examiner*—Edward R. Kazenske
*Attorney, Agent, or Firm*—B. P. Fishburne, Jr.

[57] ABSTRACT

To produce pulsating operation of vehicle wheel brakes in response to a continuous application of pressure to the brake pedal, a motor operated pressure switch controlled pulsating or pumping device is interposed between the brake master cylinder and the wheel brake cylinders of a hydraulic braking system. A ported piston within the pumping device is reciprocated and this action cyclically relieves pressure in the wheel brake cylinder lines and re-establishes braking pressure at a rapid rate of pulsation.

7 Claims, 2 Drawing Figures

ANTI-SKID BRAKE CONTROL SYSTEM

BACKGROUND OF THE INVENTION

Anti-skid brake systems for automotive vehicles, particularly heavy trailer trucks, are well known in the prior art. Examples of some of these systems in the patented prior art are contained in the following U.S. Pat. Nos.: 2,868,388, 3,809,437, 3,503,654, 3,836,209, 3,779,613, 3,932,000, 3,782,785, 3,981,545, 3,782,786, 3,985,400.

As reflected in the above-noted prior art patents, the development of anti-skid brake systems particularly for trucks has become very sophisticated and the systems are complex and quite costly. Some prior art systems are primarily electrical in their operation while others are primarily mechanical with various fluid circuit components. In general, the prior art systems are too complex and costly for practical applications to automobiles and tend to be over-engineered for this important purpose.

In light of the above, the objective of the present invention is to provide a greatly simplified and much less costly and therefore more practical anti-skid brake control system, primarily adaptable to automobiles but also usable on trucks and other heavy vehicles. The invention, while being stripped of much of the complexity of the prior art, still retains the important and necessary operational and safety capabilities of the known pulsating type anti-skid systems. The invention involves the introduction of only a single unitized pumping or pulsating component in any conventional hydraulic brake system between the master cylinder and the wheel brake cylinders. This unit which embodies the invention can readily be installed on existing vehicles or can be incorporated as original equipment on new vehicles with only a small increase in cost while greatly enhancing the safety of the vehicle.

The pumping or pulsating unit contains a ported piston which, in one position under influence of spring pressure, has its port in registration with the fluid line extending between the master cylinder and the several wheel cylinders. In a retracted position against spring pressure under influence of a solenoid controlled by a pressure switch, the piston blocks or closes the fluid line between the master cylinder and wheel cylinders and creates a suction through a port in the pumping unit which is in communication with the main line leading to the wheel cylinders, thereby relieving pressure on the wheel cylinders and associated brake shoes. The retracted piston is released automatically by the solenoid and is returned by spring pressure to the position where the piston port again registers with the main fluid line leading to the wheel cylinders and this re-establishes pressure in the wheel cylinders to reapply the brakes. This operation is repetitive or cyclical while foot pressure is continuously applied to the brake pedal of the vehicle. The pulsating brake operation which can be adjusted is estimated at a practical rate of five pulsations per second, but in some cases could be much higher, as in the range of 100 or more pulsations per second.

DETAILED DESCRIPTION

Figure 1:
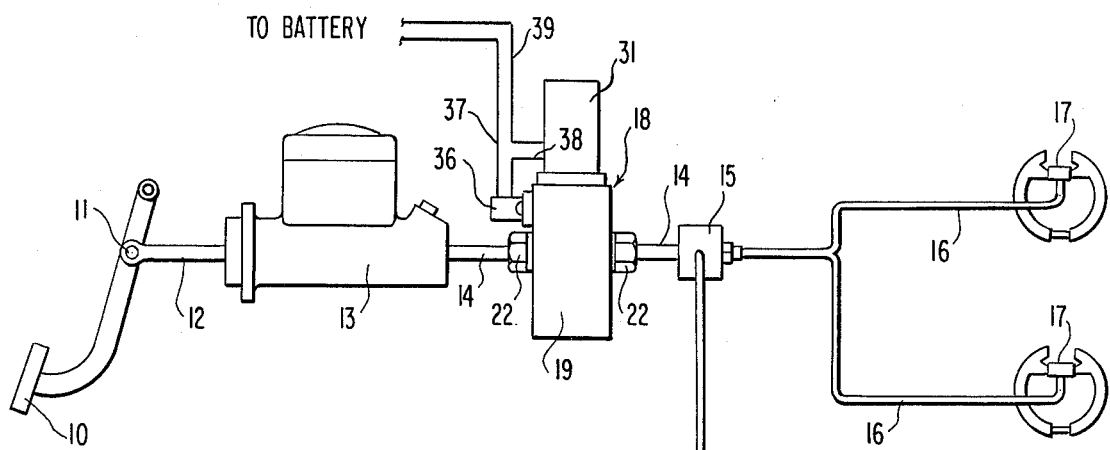
FIG. 1 is a partly schematic elevational view of the invention installed in a vehicle hydraulic braking system.

Referring to the drawings in detail, wherein like numerals designate like parts, the numeral 10 designates the customary foot pedal of an automotive hydraulic brake system, the foot pedal being connected at 11 with a piston rod 12 of a conventional brake master cylinder 13. The pressure discharge end of the master cylinder 13 is coupled with a main pressure fluid line 14 through which hydraulic pressure is normally delivered through a flow divider 15 and branch lines 16 to wheel brake cylinders 17 which operate the brake shoes or caliper devices in the case of disc brakes. The braking system as thus far described is conventional.

The anti-skid brake control means embodying this invention comprises a unitized pulsating or pumping unit 18 coupled in the main hydraulic line 14 between the master cylinder 13 and flow divider 15. More particularly, the pulsating unit 18 comprises a pump casing 19 having a piston bore 20 at right angles to the line 14. Upstream and downstream threaded nipples 21 on opposite sides of the pump housing 19 enable the pump housing to be coupled in the line 14 by conventional coupling nuts 22, as illustrated.

The pump casing 19 has a cross passage 23 at right angles to the bore and intersecting the bore 20. The cross passage 23 extends through the threaded nipples 21 and thus directly communicates with the main hydraulic line 14. A relief passage 24 is formed in the pump casing 19 on the downstream side of the bore 20 and parallel thereto and has one end intersecting the downstream branch of the passage 23 at right angles and its opposite end 25 opening through the bottom of the bore 20 centrally.

Figure 2:
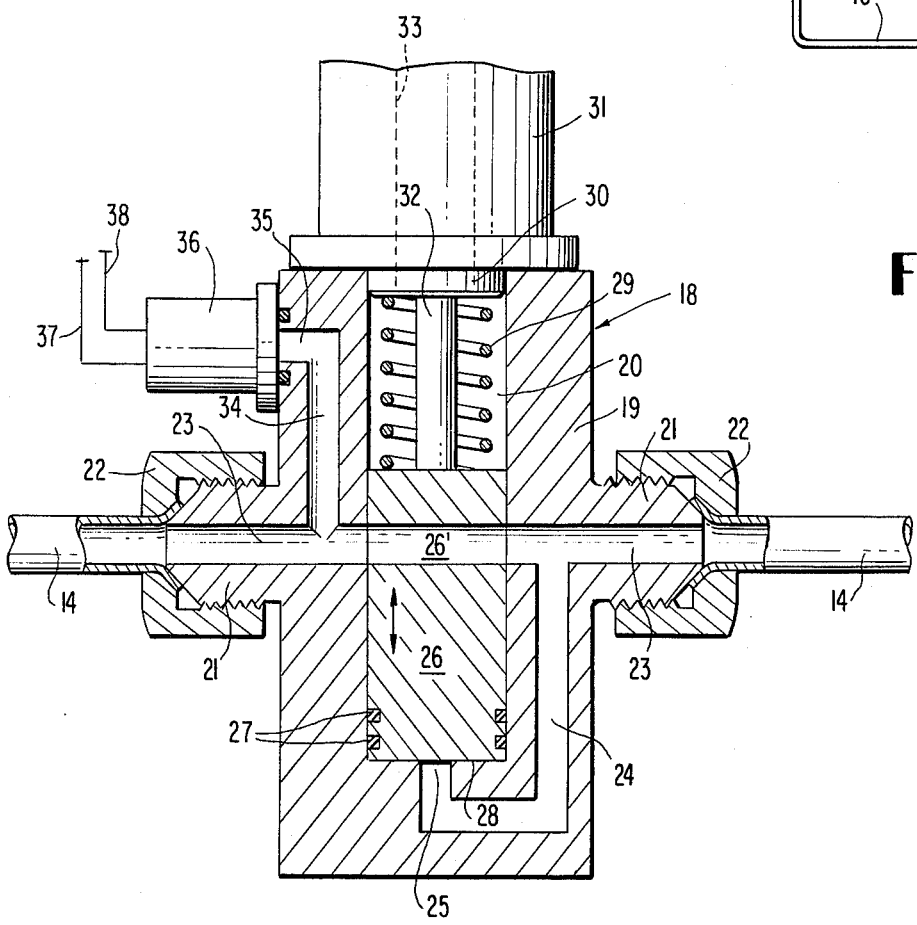
FIG. 2 is a central vertical section on an enlarged scale through a pumping or pulsating unit embodied in the invention.

A pulsing or pumping piston is disposed in the bore 20 and is equipped with piston rings 27 to seal with the bore. The piston 26 is biased toward the end wall 28 of the bore 20 by a compression spring 29 disposed in the bore 20 between the top of the piston 26 and a lower shoulder element 30 of an electrical solenoid 31 fixedly mounted on the end face of the pump casing 19 remote from the end wall 28. The piston 26 has a stem 32 secured to one end thereof, and this stem is coupled to the movable armature 33 of the solenoid 31, whereby the piston 26 at proper times can be retracted away from the end wall 28 against spring pressure and subsequently released by the solenoid automatically. The piston 26 also has a cross port 26' formed therethrough and adapted to register with fluid passage 23 when the piston is in the spring-biased rest position of FIG. 2.

The pump casing 19 has a further internal passage 34 on the upstream side of the piston bore 20 and parallel thereto and intersecting the cross passage 23 at right angles. A lateral branch 35 of the passage 34 opens through the side wall of the pump casing and is in fluid communication with a conventional pressure switch 36 which is secured to the pump casing. Thus, the passage 34 constitutes a control pressure passage for the pressure switch 36. The pressure switch 36 is electrically connected through wires 37 and 38 with the solenoid 31 and a storage battery or other source of current. Another wire 39 completes the electrical circuit between the solenoid 31 and battery. The operation of the solenoid 31 is controlled by the pressure switch 36 in a conventional manner.

OPERATION

When foot pressure is applied continuously to the pedal 10 by the driver in a panic situation or otherwise on slippery roads, the simplified anti-skid brake control system of the invention operates automatically in the following manner. The foot pedal 10, through the brake master cylinder 13, pressurizes the line 14 and cross passage 23 as well as the passage 24 and pressure switch control passage 34. The pressure switch will respond to the pressurization of passage 34 and energize the solenoid 31, whose armature will retract the piston 26 against the force of spring 29, the spring yielding to allow the piston 26 to move away from the end wall 28. When this occurs, the piston cross port 26' will be shifted out of communication with the main pressurizing passage 23 and this passage 23 will then be blocked by a solid portion of the piston 26. Simultaneously, as the piston moves away from the end wall 28, it will produce a suction in the passage 24 and in the downstream branch of passage 23 and line 14, as well as all of the branch lines 16. This suction will relieve pressure in the wheel cylinders 17 thus releasing the pressure of the brake shoes on the brake drums momentarily.

At the top of its travel away from the end wall 28, the piston 26 is automatically released by the solenoid 31, the latter being of a conventional tripping type which, when energized, retracts and releases in a continuing cycle of operation. When the solenoid thus releases the piston, spring 29 quickly returns the piston to its position of FIG. 2 where communication of the passage 23 with the piston port 26 is re-established, it being understood that foot pressure is being applied continuously to the pedal 10 during the entire cycle of operation, and the master cylinder 13 is continually pressurizing the line 14. When the piston 26 is returned to its position of rest shown in FIG. 2, positive pressure is re-established in the passage 24 and in the downstream parts of passage 23 and line 14 and also to the wheel cylinders 17 to re-apply the brakes.

As long as pressure is maintained on the pedal 10 by the driver, the master cylinder 13 will continue to pressurize the main line 14 and the pressure switch 36 will be pressurized to maintain the solenoid energized. As a result, the piston 26 will be reciprocated by the activity of the solenoid and the spring 29 to cyclically relieve pressure in the wheel cylinders 17 and re-establish the pressure to operate the brakes in a pulsating manner which greatly reduces the danger of skidding, as is well known. In practice, the rate of brake pulsation can vary over a relatively wide range, as previously noted.

It should also be mentioned that the solenoid 31 which is conventional contains built-in adjusting means to regulate its rate of operation in retracting and then releasing the piston cyclically. An adjustment, not shown, can also be provided in the system to vary the volume of fluid displacement and replacement during operation. The variation here would be the differential between large and small systems. Such adjusting means is conventional and need not be illustrated.

While a linear type actuator for the piston 26 has been illustrated and described herein in the form of an electrical solenoid, it should be understood that the piston can be reciprocated by different types of actuators or motor means. For example, a small electric motor, not shown, geared to a shaft having a cam thereon and with the cam suitably engaged with cam follower means on the piston can reciprocate the piston at any desired rate within wide limits. This motor cam piston driving arrangement is thought to be more suitable for larger braking systems. The arrangement would also eliminate the need for a piston return spring such as the spring 29.

Additionally, the invention may be equipped with a fail-safe means by providing a delayed action by-pass valve in the system.

It may now be seen that the invention is characterized by simplicity of construction and operation, and is far less complex than the prior art. The main pulsating unit 18 is easy to install in a conventional automotive brake system at a mere fraction of the cost of prior art devices. The advantages of the invention should be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In an anti-skid brake control system, a brake master cylinder for pressurizing the system responsive to brake pedal pressure, wheel brake cylinders, fluid conduit means interconnecting said master cylinder and wheel brake cylinders, and a pulsator unit connected in said conduit means between said master cylinder and said wheel brake cylinders, said pulsator unit comprising a casing having a bore and a passage intersecting the bore and connected in said conduit means, said casing having a second passage interconnecting one end of the bore with the first-named passage on one side of the bore, said casing having a third passage communicating with the first-named passage on the other side of said bore and extending to the exterior of the casing, a piston in said bore and having a cross port adapted in one position of the piston to register with the first-named passage on both sides of the bore, drive means connected with the piston to reciprocate it in said bore, the piston when retracted by the drive means having said cross port out of registration with the first-named passage and a solid part of the piston then blocking the first-named passage, the piston then creating suction in the second passage to relieve pressure in said wheel brake cylinders, and a control device for said drive means connected with the casing in communication with said third passage and responding to pressure in such passage to activate the drive means.

2. In an anti-skid brake control system as defined in claim 1, said drive means comprising a linear actuator coupled with said piston.

3. In an anti-skid brake control system as defined in claim 2, and said linear actuator comprising a solenoid, and a spring engaging said piston and biasing it toward said one position where the cross port of the piston registers with the first-named passage, and said control device comprising a pressure-responsive control switch electrically coupled to said solenoid.

4. In an anti-skid brake control system as defined in claim 1, and said third passage of the casing being on the upstream side of said bore and piston and receiving full pressure generated by the master cylinder in all positions of the piston and piston cross port.

5. In an anti-skid brake control system as defined in claim 1, said second passage of the casing being on the downstream side of the casing bore and piston and isolated from the full pressure of the master cylinder when the piston cross port is out of registration with the first-named passage.

6. In an anti-skid brake control system as defined in claim 1, and said drive means including a spring urging said piston in one direction in said bore.

7. In an anti-skid brake control system, a brake master cylinder for pressurizing the system responsive to brake pedal pressure, wheel brake cylinders, fluid conduit means interconnecting said master cylinder and wheel brake cylinders, and a pulsator unit connected in said conduit means between said master cylinder and said wheel brake cylinders, said pulsator unit comprising a casing having a bore and a passage intersecting the bore and connected in said conduit means, said casing having a second passage interconnecting one end of said bore with the first-named passage on one side of the bore, a piston mounted for reciprocation in said bore and having a passage means adapted in one position of the piston to register with the first-named passage on opposite sides of the bore, drive means connected with the piston to reciprocate it in said bore, the piston when retracted by operation of the drive means having said passage means out of registration with said first-named passage and a solid part of the piston then blocking the first-named passage, the piston then creating suction in said second passage to relieve pressure in said wheel brake cylinders, and a brake system pressure responsive control device for said drive means.

* * * * *